United States Patent [19]

Davey et al.

[11] Patent Number: 4,797,314
[45] Date of Patent: Jan. 10, 1989

[54] SURFACE COVERING PRODUCT

[75] Inventors: Raymond G. Davey, Lancaster; Martin Dees, Jr., Landisville, both of Pa.

[73] Assignee: Armstrong World Industries, Inc., Lancaster, Pa.

[21] Appl. No.: 127,036

[22] Filed: Nov. 27, 1987

[51] Int. Cl.$^4$ .............................................. B05D 5/06
[52] U.S. Cl. .................................... 428/167; 428/168; 428/172; 428/173
[58] Field of Search ............................... 428/156–173

[56] References Cited

U.S. PATENT DOCUMENTS

| | | | |
|---|---|---|---|
| 1,873,098 | 8/1932 | Young | 428/167 |
| 1,989,704 | 2/1935 | Sequillon | 428/167 X |
| 2,057,873 | 10/1936 | Atwood | 428/167 X |
| 2,366,209 | 1/1945 | Morris | 428/167 |
| 2,587,594 | 3/1952 | Chavannes et al. | 428/167 X |
| 3,305,381 | 2/1967 | wan Wagienen | 428/167 X |
| 3,804,657 | 4/1974 | Eyman et al. | 428/172 X |
| 3,810,813 | 5/1974 | Ellis | 428/172 |
| 3,931,429 | 1/1976 | Austin | 428/172 X |
| 3,958,043 | 5/1976 | McKee, Jr. et al. | 428/172 X |
| 4,068,030 | 1/1978 | Whitman | 428/172 X |
| 4,126,727 | 11/1978 | Kaminski | 428/172 |
| 4,214,028 | 7/1980 | Shortway et al. | 428/172 X |
| 4,320,163 | 3/1982 | Schwartz | 428/172 X |

Primary Examiner—Nancy A. B. Swisher

[57] ABSTRACT

A surface covering product is disclosed which comprises a substrate material, an impervious coating upon said material, and raised elements selectively printed upon said coating, which raised elements comprise a thixotropic plastic containing particles of solid material. A method for the preparation of the product is also disclosed.

11 Claims, 1 Drawing Sheet

SURFACE COVERING PRODUCT

BACKGROUND OF THE INVENTION

The present invention relates to a surface covering product. In particular, the present invention relates to a surface covering product comprising a substrate material having an impervious coating applied thereon, with raised elements of a plastic material containing solid materials selectively disposed upon said coating.

In the prior art, is known to provide surface covering products having disposed thereon raised elements which contain particles of solid material. For example, U.S. Pat. No. 4,348,447 to Miller and Petzold shows non-skid plastic flooring structures in which inorganic particles are embedded in a cured plastic matrix in a substantially abutting relationship. Since the adhesive can be printed in a selective pattern, the raised elements give the appearance of an embossed-in-register flooring material. Because such particles are applied to the adhesive surface of the matrix, however, particles applied in this manner typically do not penetrate uniformly throughout the plastic matrix. In addition, the number of particles is substantially limited and the particles must be covered over with a thin coating of clear plastic material to fully bond them to the material. In coating the particles with such a thin film, the underlying coating, interstitial to the raised elements, is coated also.

In each of these references, however, the raised elements, while they may have some decorative value, would have interferred with and obscured any underlying decoration, if such decoration were present. Further, such raised elements while useful for increasing wear resistance and slip resistance, create additional difficulties in the maintenance of the surfaces, and additional care must be taken in the maintenance of flooring employing such devices.

SUMMARY OF THE INVENTION

It is an object of the present invention to increase the number of solid particles which can be positioned in raised elements on a surface covering product.

It is a further object of the present invention to provide a surface covering product in which the solid particles present in raised elements on the surface thereof are more evenly distributed throughout these raised elements.

It is a still further object of the present invention to provide a surface covering product with selectively placed raised elements to create embossed-in-register features without the need for chemical or mechanical embossing.

It is a still further object of the present invention to provide a surface covering product having raised elements without the need to provide an over coating of clear plastic material.

According to one embodiment of the present invention, there is provided a surface covering product comprising a substrate material, an impervious coating upon said substrate material and raised elements selectively disposed upon said coating which raised elements comprise a thixotropic plastic containing particles of solid material.

According to another embodiment of the present invention, there is provided a method for the preparation of a surface covering product which method comprises providing an impervious coating upon a substrate material, selectively positioning raised elements of a thixotropic plastic containing particles of solid material, and fusing the raised elements to the substrate to provide a covering product of unitry construction.

DETAILED DESCRIPTION OF THE INVENTION

Raised surface elements, and particularly raised surface elements containing solid particles, have long been employed as a way of increasing the slip resistance or abrasion resistance of surface coverings. In the present invention, a product having such raised surface elements of a thicker aspect can be provided in a process which does not require coating of the elements and surrounding areas.

Figure 2:
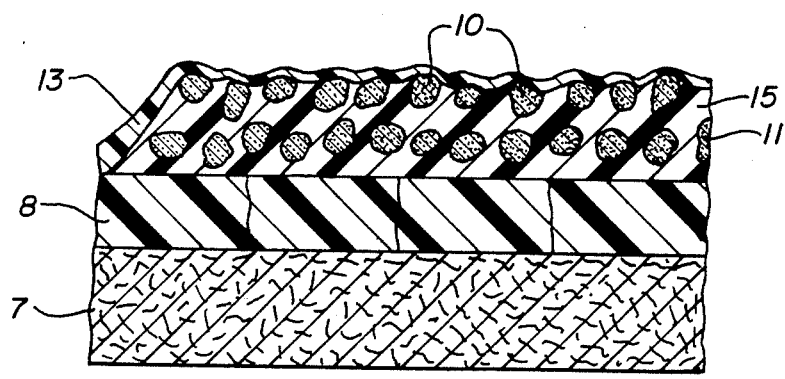
FIG. 2 shows a cross-sectional view of the product of the prior art as shown in U.S. Pat. No. 4,348,447.

In the prior art, such a construction as that shown in FIG. 2 has been produced by preparing a substrate 7 with a suitable coating 8 and selectively applying an adhesive material 15, such as an ungelled plastisol. Solid particles, such as elements 10 and 11, are then applied uniformly but adhere only in the adhesive portions with the remainder being removed. In order to hold the particles in position, the material is then coated with a uniform layer of clear wear layer material 13.

Figure 1:
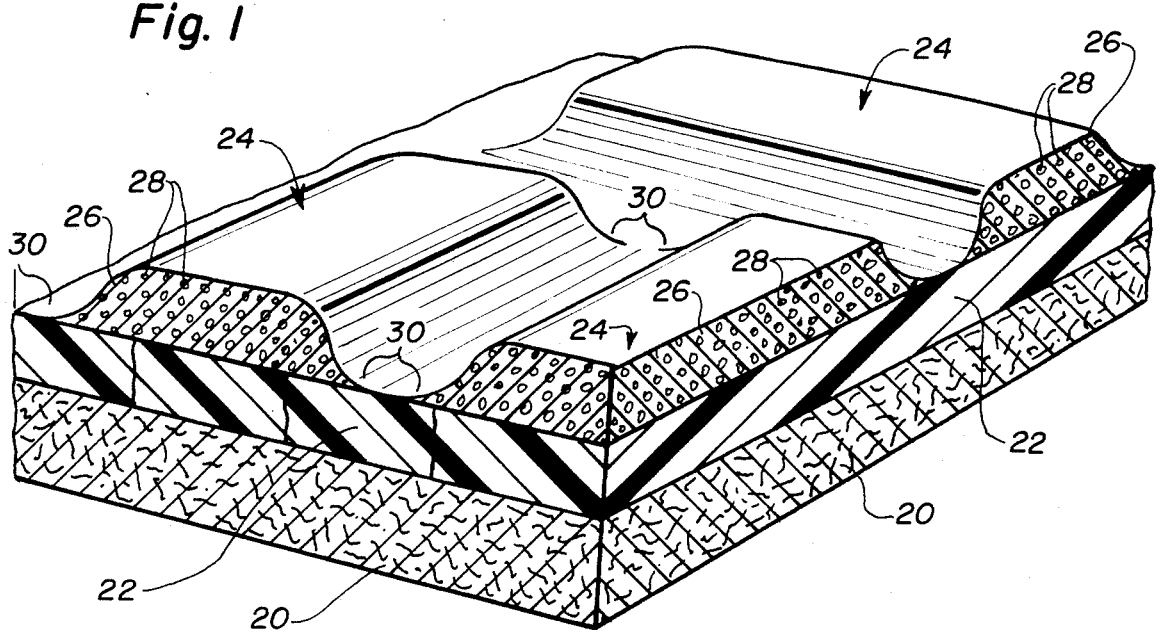
FIG. 1 shows a cross-sectional view of the product of the present invention.

In the present invention as shown in FIG. 1, a substrate 20 is prepared with a suitable impervious coating 22 and then selectively provided with raised elements 24 comprised of a thixotropic plastic material 26 containing particles of solid material 28. Since no clear wear layer need be employed to permanently bind the particles as in the prior art, portions of the underlying coating 22, represented as 30, may be left uncoated in the final product.

The Substrate

The present invention is not believed to be dependent on the substrate employed. Rather, it is believed that any of the substrates normally employed in this field can be employed in the practice of the present invention. A suitable substrate can be the below described plastisol saturated glass mat of the Example or a wet-laid felted sheet, also common in the surface covering art, could be employed with equal advantage. Further, either substrate could be back-coated with a foamed or compact coating to form an interliner product.

Certainly, it is not envisioned that the present invention will be limited in anyway by the choice of substrate. Choices among available substrates would be made on some basis such as manufacturing convenience or physical property requirements of the end product.

The Coating

Once a substrate is chosen, it should be coated with a suitable impervious material. While it would be possible to apply the raised plastic elements directly to a wet-laid felt, without the application of an impervious layer to protect the interstitial felt, the product would have limited commercial value. At the very least, a decorative coating would normally be applied even if the final product is to be wear layered for protection.

Of course, a glass mat must be prepared with an impervious coating, usually a plastisol which may or may not be foamable, to impregate the mat and seal over the glass fibers.

Thus, the coating which must be employed may be as simple as a sealant for a wet-laid felt or as complex as a multilayered, multi-element construction. In all cases the impervious coating must be of wear layer quality, i.e. capable of standing up to normal wear for a floor covering. The practice of the present invention is not intended to be bound by the particular impervious coating employed. Many coatings and coating methodologies are known to the art which would have application to the present invention, including foamable and non-foamable plastisols, resinous dry blends, stencil layups and the like.

The coating should, however, be impervious to the material deposited thereon so that the thixotropic material deposited remains on the surface to form a raised element.

The Raised Elements

Over the impervious coating, raised elements are created by depositing beads of a pseudoplastic thixotropic liquid containing solid particles. Such deposition can be carried out using various methods known to the art, however, screen printing, though normally employed to deposit inks on porous surfaces, has been employed with good success and is described in the example which follows.

The raised elements may be in any shape or pattern, however, geometrics such as repeated patterns of raised circles, squares, diamonds and the like have been demonstrated to be effective visually. As in other products in this field, the number of such elements per unit should be complete enough to effectively form a wear surface for the covering. The depressed areas between the raised areas serve both as a decorative element and a structural function, such as channels to carry away liquid spills, and the like.

The raised elements may be from about three one-thousandths of an inch (0.003") to about eight one-hundredths of an inch (0.08") above the underlying substrate material, preferably from about fifteen one-thousandths of an inch (0.015") to about forty-five one-thousandths of an inch (0.045"), and most preferably about three one-hundredths of an inch (0.03"). Further, the raised elements should cover from about thirty percent (30%) to about eighty percent (80%) of the total surface area in the final product in order to provide an effective wear surface, with the exact percentage a function of the geometry of the raised elements.

The Thixotropic Material

The present invention is made possible through the combination of an impervious coated substrate and the rheological characteristics of the plastic material applied. With an application methodology such as a rotary screen, a pseudoplastic thixotropic material can be deposited on the coated substrate in thicknesses exceeding that of normal printing inks. Because of the properties of the material, lateral flow can be controlled or substantially eliminated.

Thixotropic materials are materials that exhibit dual rheological behavior, that is, they exhibit high viscosity under low shear and low viscosity under high shear.

Fumed and precipitated silicas are probably the most often used thixotropic agents, or thixotropes, although various inorganic and organic materials are known to be operative, including such inorganic materials as very fine particle organophilic clays and such organic materials as highly substitute sorbatols or calcium/organic complexes. In the Example which follows, fumed silica, available commercially from the Degussa Company, under the trade designation Aerosil 200, has been employed to advantage.

The quantity of such material added to the resin paste system will determine the thixotropic nature of the resulting system, and its viscosities under various rates of shear. Such properties will determine the lateral flow of the plastisol deposited as raised elements on the substrate. The viscosity and shear rate of plastisol thixotropic material are related and the viscosity of the thixotropic material is measured to ensure the desired lateral flow of the material deposited.

The measurement of viscosity when taken with a Brookfield viscometer ranges from 80 to 160 poise using a No. 6 spindle at 20 revolutions per minute. Viscosity is adjusted by varying the amount of plasticizer or other suitable viscosity depressants.

Various resinous materials may be employed as the thixotropic material in the present invention and these include virtually any useful resinous plastisols, while polyvinyl chloride resins have been employed with advantage in the Example which follows.

To be useful in the practice of the present invention, sufficient thixotropic material must be present to enable the resin system to remain plastic under shear, losing its pseudoplastic characteristics rapidly when the shear force is removed.

The pseudoplastic characteristics is illustrated by the Haake RV-1 Viscometer graph below:

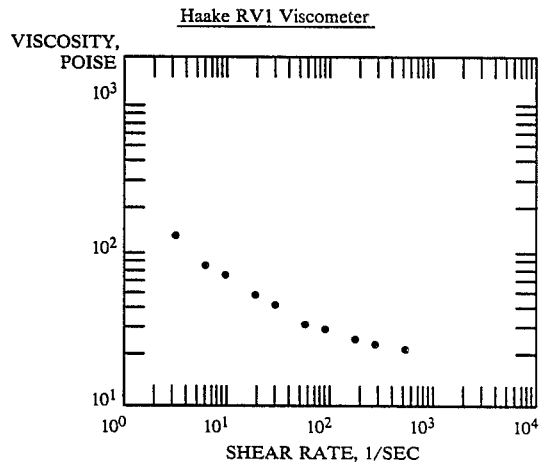

Haake RV1 Viscometer

It can be seen from the graph that the thixotropic material herein, a PVC slurry plastisol, exhibits high viscosity under low shear and low viscosity under high shear.

The Particles

Although the thixotropic material itself provides a wear surface on the end product, the abrasion properties of such wear surface will typically be greatly improved by the addition of solid particles. Such particles may be an organic material such as rubber or a plastic material, such as vinyl, or an inorganic material such as silica quartz or the like. These particles may be clear or coated or colored in some way, such as resin-coated sands which are known to the art.

In order to be useful in the present invention, the particles should be of suitable dimension to pass through a No. 10 U.S. Standard seive series mesh, a screen (U.S. Standard) with openings of about two millimeters (2.0 mm) and yet be retained on a No. 200 mesh screen (U.S. Standard), with openings of about seventy microns (70 u.m.). Preferred results, however, have been obtained with particles which would pass through a No. 25 mesh screen (U.S. Standard) with openings of about six hundred microns (600 u.m.) and be retained on a No. 50 mesh screen (U.S. Standard), with openings of about two hundred fifty microns (250 u.m.). The particles of solid material are of a MOHS hardness of 7 to 9, and preferably about 7.

EXAMPLE 1

A sixteen hundred foot (1,600 ft.) roll of four meter wide (4 m.) fiber glass mat obtained commercially from the Schuller Company was saturated with 500 grams per square meter of a plastisol of the following composition and gelled in contact with an oil-filled drum preheated to 290°-295° F.

| Component | Trade Name | Source | Weight Percent |
|---|---|---|---|
| PVC Resin | (Lucovyl PB-1702 | ATO Chemcial Products (UK) | 65.3 |
| PCV Resin | (Pevikon PE-820) | KemaNord Plastics (UK) | 23.9 |
| PCV Resin | (Vinnol C65V) | Wacker (W. Germany) | 11.7 |
| Plasticizer | (Hexaplas OpN) | Imperial Chem. Ind. (UK) | 5.1 |
| Plasticizer | (Santicizer DP-268) | Monsanto Europe (Brussels) | 9.2 |
| Plasticizer | (TXIB) | Eastman Chemical | 2.5 |
| Plasticizer | (Cereclor S-45) | Imperial Chem. Ind. (UK) | 2.5 |
| Stabilizer | (Ingestab BZ-505) | Ciba Geiby | 1.5 |
| Plasticizer | (ED-6) | Lankro Chemicals Ltd. (UK) | 0.8 |
| Filler | Alumina trihydrate | BA Chemicals Ltd. (UK) | 21.0 |
| Grey pigment paste | | | 6.5 |
| | | | 100.0 |

Following this, the smooth surface of the plastisol saturated mat was coated with 380 grams per square meter of a plastisol of the following composition and gelled in contact with a second oil-filled drum preheated to 285°-290° F. to form the impervious coating of wear layer quality.

| Component | Trade Name | Source | Weight Percent |
|---|---|---|---|
| PVC Resin | (Lucovyl PB-1702) | ATO Ohemical Products (UK) | 20.7 |
| PVC Resin | (Pevikon PE-820) | KemaNord Plastics (UK) | 32.4 |
| PVC Resin | (Vinnol C65V) | Wacker (W. Germany) | 15.9 |
| Plasticizer | (Hexaplas OPN) | Imperial Chem. Ind. (UK) | 6.9 |
| PIasticizer | (Santicizer DP-268) | Monsanto Europe (Brussels) | 9.0 |
| Plasticizer | (TXIB) | Eastman Chemical | 3.4 |
| Plasticizer | (Cereclor S-45) | Imperial Chem. Ind. (UK) | 3.4 |
| Stabilizer | (Ingestab BZ-505) | Ciba Geigy | 2.0 |
| Plasticizer | (ED-6) | Lankro Chemicals Ltd. (UK) | 1.0 |
| Grey pigment paste | | | 5.3 |
| | | | 100.0 |

A particle containing plastisol of the following composition was then screen printed in a regular geometric pattern onto the surface of the gelled impervious coating.

| Component | Trade Name | Source | Weight Percent |
|---|---|---|---|
| PVC Resin | (Pevikon PE 820) | KemaNord Plastics (UK) | 43.1 |
| FVC Resin | (Vinnol C65V) | Wacher (W. Germany) | 10.8 |
| Plasticizer | (Santicizer DP-268 | Monsanto Europe (Brussels) | 11.9 |
| Plasticizer | (Hexaplas OPN) | Imperial Ohem. Ind. (UK) | 2.7 |
| Plasticizer | (TXIB) | Eastman Chemical | 10.8 |
| Epoxy Oil | | Lankro Chemical (UK) | 1.6 |
| Stabilizer | (Ingestab BZ 505) | Ciba Geigy | 1.1 |
| Fumed Silica | (Aerosil 200) | Degussa Corp. | 0.5 |
| Quartz particles | | | 15.0 |
| Gray pigment paste | | | 2.5 |
| | | | 100.0 |

The viscosity of the plastisol with particles set forth above must be between 80 to 160 poise for the desired results. Viscosity is adjusted by varying the amounts of TXIB plasticizer.

The printed plastisol was then gelled and fused by passing through a hot air oven maintained at approximately 390° F. for two minutes.

The resulting composite product had regularly-placed raised elements simulating an embossed-in-register design, which elements contained a substantially uniform dispersion of solid particles throughout.

EXAMPLE 2

It is possible to form the product herein with a flat surface.

The product herein is made the same way as the product of Example 1 except that an additional coating is added prior to fusion of the product. After the raised elements are gelled, an overall coating of the impervious coating material above is applied to fill in the depressed areas around the raised elements. When the grey pigment paste is removed from the impervious coating material, the coating filling in the depressed areas will be transparent and the Example 1 and 2 products will look substantially the same, but the Example 2 product will have a flat upper surface.

What is claimed is:

1. A surface covering product comprising:
   (a) a substrate material,
   (b) an impervious coating bonded to at least one surface of said substrate material, and
   (c) raised elements having a thickness between about 0.003 inch and 0.080 inch selectively arranged in a space pattern upon said coating, comprising a thixotropic plastic containing particles of solid material, wherein said thixotropic plastic contains at least one thixotrope chosen from the group consisting of fumed silicas, precipitated silicas, finely powdered organophilic clays, highly substituted sorbatols and calcium/organic complexes.

2. The surface covering product of claim 1 wherein the substrate material is a fiber glass mat.

3. The surface covering product of claim 1 wherein the substrate material is a wet-laid fibrous composite sheet.

4. The surface covering product of claim 1 wherein the particles of solid material are of a MOHS hardness of 7 to 9.

5. The surface covering product of claim 4 wherein the particles of solid material are, at least in part, organic.

6. The surface covering product of claim 5 wherein the particles are, at least in part, chips of vinyl resin.

7. The surface covering product of claim 4 wherein the particles of solid material are, at least in part, inorganic.

8. The surface covering product of claim 7 wherein the particles are, at least in part, silica quartz.

9. The surface covering product of claim 4 wherein the raised elements are disposed in a regular geometric pattern.

10. The surface covering product of claim 1 wherein the raised elements are arranged to form a means simulating an embossed-in-register product and the raised elements cover 30% to 80% of the surface area of the surface covering.

11. The surface covering product of claim 1 wherein the area between the raised areas is filled in to provide a flat surface sheet.

* * * * *